Feb. 23, 1965 F. M. TOWNSEND 3,170,766
SULFUR RECOVERY APPARATUS
Filed March 30, 1959 9 Sheets-Sheet 1
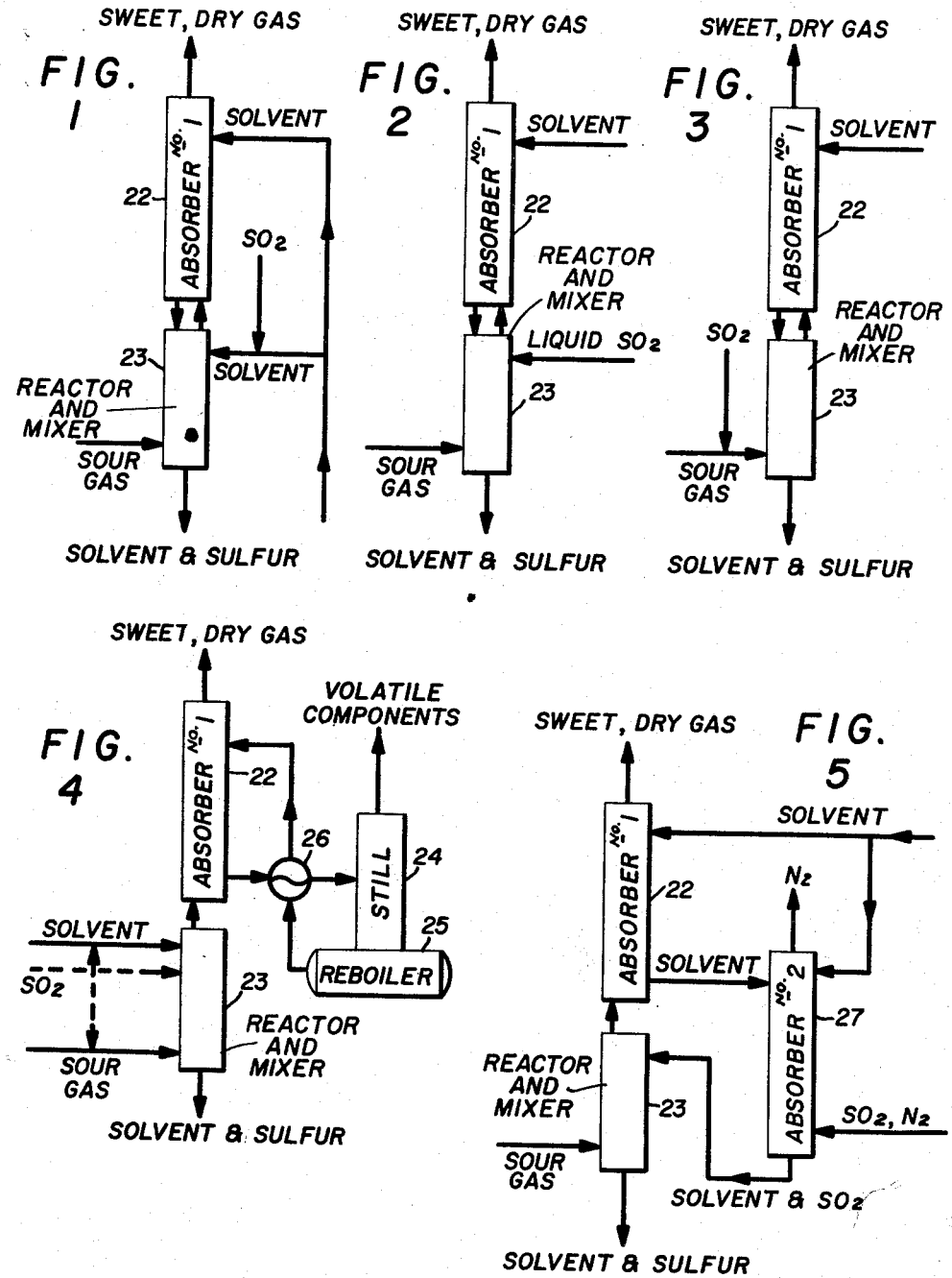
INVENTOR.
FRANCIS M. TOWNSEND
BY
ATTORNEYS

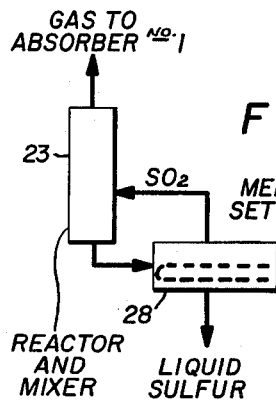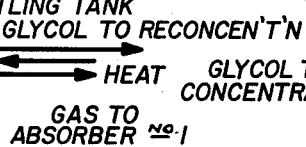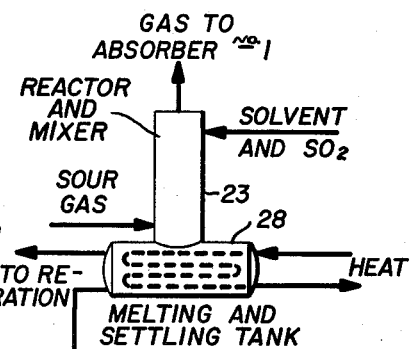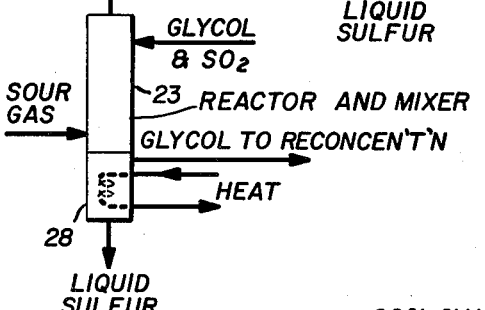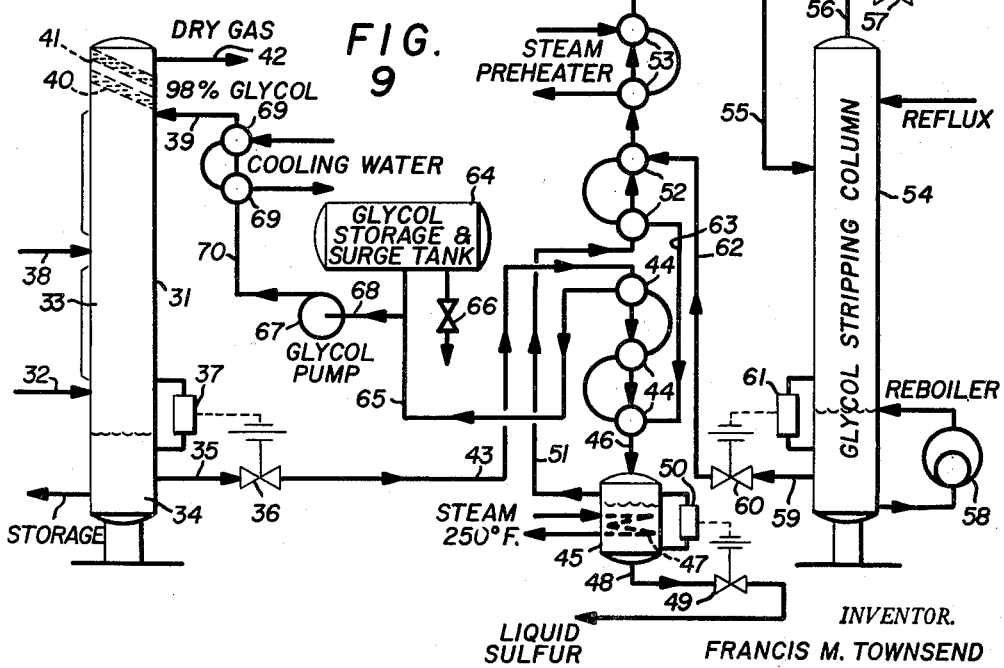

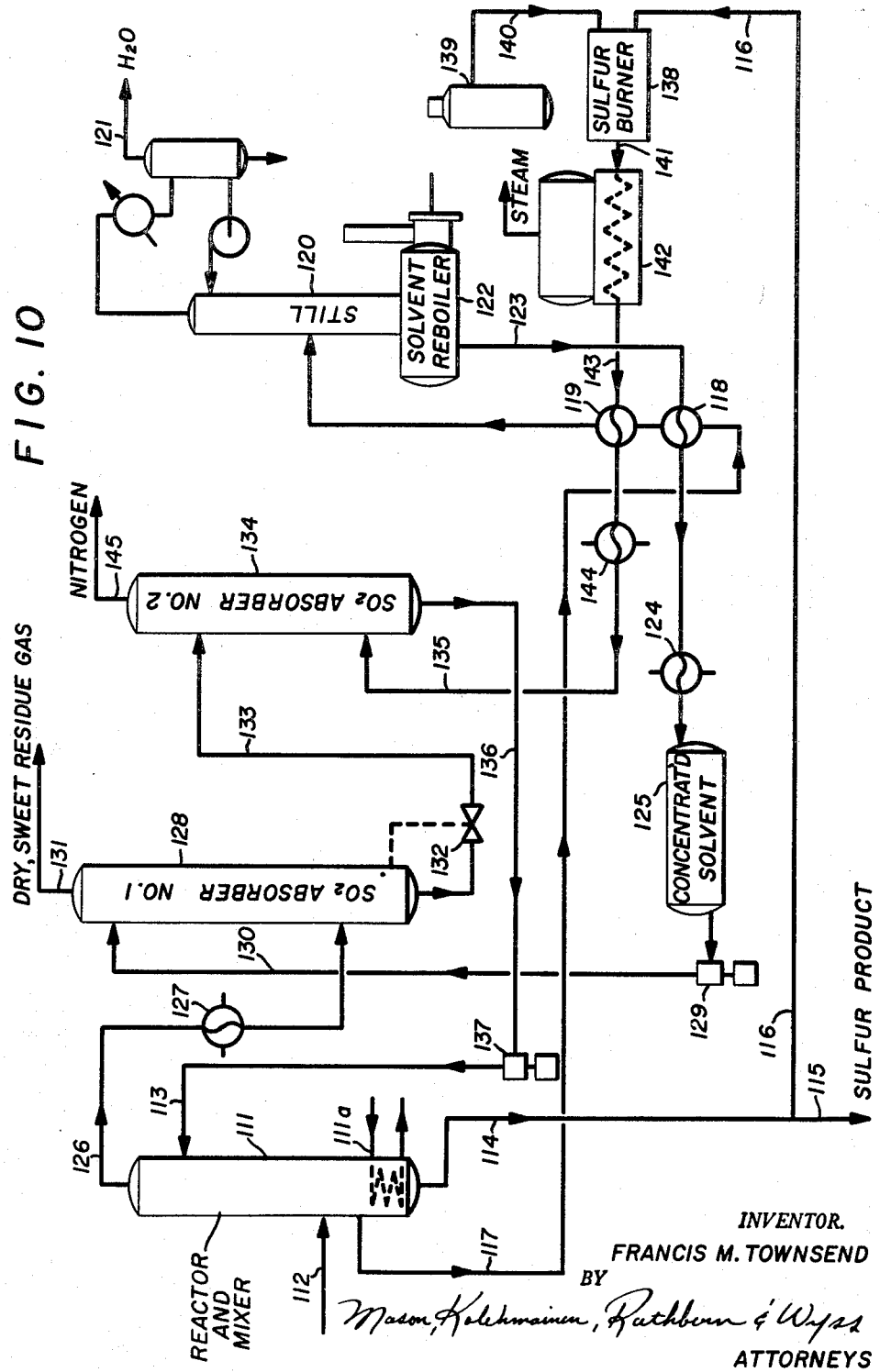

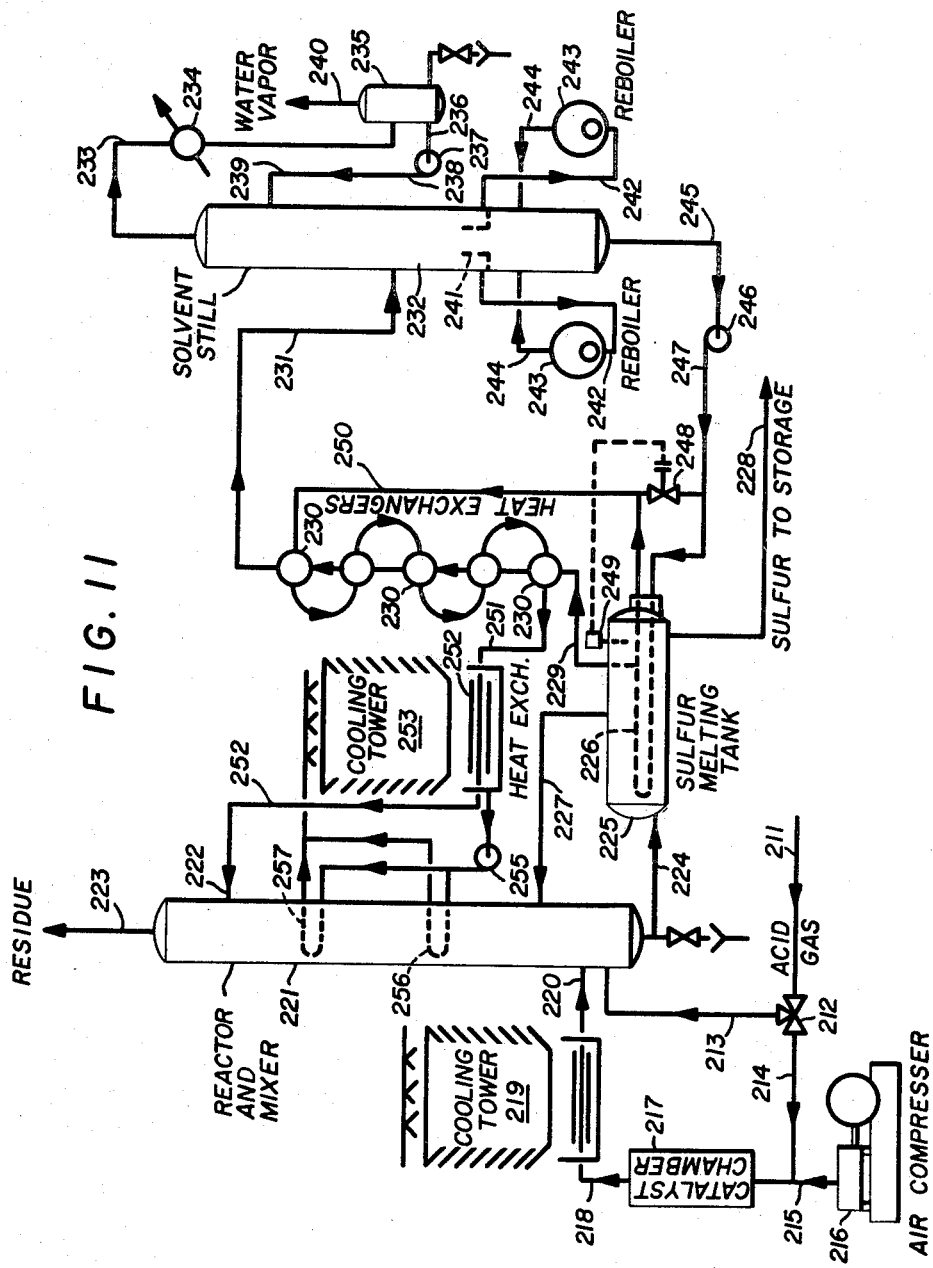

Feb. 23, 1965 F. M. TOWNSEND 3,170,766
SULFUR RECOVERY APPARATUS
Filed March 30, 1959 9 Sheets-Sheet 5

INVENTOR.
FRANCIS M. TOWNSEND
BY
Mason, Kolehmainer, Rathburn & Wyss
ATTORNEYS

Feb. 23, 1965   F. M. TOWNSEND   3,170,766
SULFUR RECOVERY APPARATUS
Filed March 30, 1959   9 Sheets-Sheet 7

INVENTOR.
FRANCIS M. TOWNSEND
BY
Mason, Kolehmainen, Rathburn & Wyss
ATTORNEYS

Feb. 23, 1965  F. M. TOWNSEND  3,170,766
SULFUR RECOVERY APPARATUS
Filed March 30, 1959  9 Sheets-Sheet 8

INVENTOR.
FRANCIS M. TOWNSEND
BY
Mason, Kolehmainen, Rathburn & Wyss
ATTORNEYS

INVENTOR.
FRANCIS M. TOWNSEND
BY
Mason, Kolehmainen, Rathburn & Wyss
ATTORNEYS

SULFUR RECOVERY APPARATUS
Francis Mark Townsend, Norman, Okla., assignor to
Laurence S. Reid, Norman, Okla.
Filed Mar. 30, 1959, Ser. No. 802,980
8 Claims. (Cl. 23—263)

The invention relates to apparatus for the recovery of sulfur from sour gas mixtures. More particularly, this invention relates to apparatus for removing hydrogen sulfide from sour natural gas and recovering, as elemental sulfur, the sulfur content of the hydrogen sulfide.

Numerous workers in this art have investigated the basic method for recovering sulfur from hydrogen sulfide, according to the equations:

(1) $\quad S + O_2 \rightarrow SO_2$ (2) $\quad 2H_2S + SO_2 \rightarrow 3S + 2H_2O$ (3) $\quad 2H_2S + O_2 \rightarrow 2S + 2H_2O$ (4) $\quad H_2S + \tfrac{3}{2}O_2 \rightarrow SO_2 + H_2O$ (2) $\quad 2H_2S + SO_2 \rightarrow 3S + 2H_2O$ (3) $\quad 2H_2S + O_2 \rightarrow 2S + 2H_2O$ Until this invention, no process or equipment has been developed to use these basic reactions which is economically attractive for relatively small scale production, or for removing the hydrogen sulfide from gases in which it was present only in minute amounts.

This application is a continuation-in-part of my copending application Serial No. 587,991, filed May 29, 1956 (now Patent No. 2,881,047, dated April 7, 1959), which is a continuation-in-part of my prior application, Serial No. 392,650, filed November 17, 1953, now abandoned.

The Claus process, for example, makes use of these reactions. To practice the Claus process, a sour gas mixture must be treated by the Girbotol process, wherein an aqueous solution of mono-, or di-, or tri-ethanolamine reacts with the hydrogen sulfide and carbon dioxide components of the gas mixture and effects their removal. These acid gases are then released from the amine solution by heat. In the Clause process, one-third of this acid gas mixture is separated and oxidized to form the proper amount of sulfur dioxide to enter into the reaction in the equations above. The remaining hydrogen sulfide and this sulfur dioxide are then combined and the reaction between them is catalyzed by their passage through a bed of bauxite. The reaction temperature during passage through the catalyst is sufficiently high that the sulfur formed by the reaction remains in vapor form. The sulfur vapors are then condensed, recovered, and stored in liquid or solid state. While this process looks attractive from a theoretical standpoint, it has many undesirable features as a commercial process. For example, the amine absorption process for removing hydrogen sulfide from the feed gas requires a relatively high capital investment, and entails high maintenance costs, due to corrosion, particularly where carbon dioxide is present in the feed gas in appreciable percentages and is absorbed by the amine solutions, along with the hydrogen sulfide, and liberated as carbonic acid. In many instances, the carbon dioxide content of the acid gas mixture is so great that it is impossible to oxidize this gas to produce the sulfur dioxide requirement without adding substantial amounts of natural gas to form a combustible mixture. Usually, the addition of this hydrocarbon gas causes carbon deposition on the catalyst, reducing its effectiveness progressively to the point where it becomes inoperative. The minimum economic capacity for a plant of this type with a single catalyst chamber is from 8 to 10 tons of elemental sulfur per day. Where a higher recovery efficiency is desired, two catalyst chambers are installed in series with sulfur condensers and a gas re-heater between chambers. In this instance the minimum economic capacity is about 25 tons of elemental sulfur per day.

The object of this invention is to provide a more efficient, and less expensive, single-stage apparatus for the recovery of elemental sulfur from gases containing hydrogen sulfide, which apparatus will have a relatively low minimum economic capacity in terms of tons of elemental sulfur per day.

A further object of the invention is to provide new equipment for the reaction between hydrogen sulfide and sulfur dioxide in which the sulfur produced by the reaction is formed rapidly and in such particle size as to be readily recoverable.

Another object of the invention is to provide apparatus for the simultaneous dehydration and desulfurization of sour gas and for the recovery of elemental sulfur therefrom.

Still another object of the invention is to provide equipment for the effective removal of small quantities of hydrogen sulfide from natural gas and other gases.

A further object of this invention is to provide apparatus for removing both hydrogen sulfide and nitrogen from natural gas.

These and other objects of the invention are accomplished by apparatus in which the sour gas, meaning any gaseous mixture containing hydrogen sulfide, is sweetened by flowing it in intimate contact with a solution of sulfur dioxide in a concentrated aqueous solution of a neutral, inert, stable, organic solvent having a vapor pressure at 20° C. of not more than about 10 millimeters of mercury and wherein the solubility of water in the organic solvent is at least about 2% by weight at 20° C. and preferably not less than about 5% by weight at 20° C. The aqueous solution of the organic solvent acts both as a catalyst and as a medium for the reaction between hydrogen sulfide and sulfur dioxide. The reaction is virtually instantaneous, and particles of sulfur are formed and dispersed in the solution. These particles may be easily separated from the aqueous organic solvent to remove and to recover elemental sulfur.

The fundamental reaction of the invention may be demonstrated on a laboratory scale by dissolving sulfur dioxide in a concentrated aqueous solution of triethylene glycol, for example, until a distinct yellow color is obtained. If hydrogen sulfide, from the reaction of a strong acid and sodium sulfide, is then passed through the solution, a cloudy dispersion of precipitated sulfur forms immediately. Upon standing, the sulfur will settle and is recoverable.

The basic innovation upon which the success of this invention depends is the use of apparatus in which a concentrated, aqueous solution of an organic solvent having the properties set forth above, is the reaction medium. Any neutral, stable, inert organic solvent having the specified vapor pressure and solubility properties may be used, so long as the organic solvent contains at least two heteroatoms (i.e., atoms of elements other than hydrogen and carbon), at least one of which is a lower chalcogen such as oxygen or sulfur, and so long as the number of vicinyl hydroxyl radicals does not exceed two. The heteroatoms appear necessary to provide sufficient solubility of sufur dioxide in the organic solvents. Solvents with three or more vicinyl hydroxyl groups are unsatisfactory, due to instability and decomposition. With aqueous solutions of solvents within the class defined above, which are preferably at least 90% by weight organic material, the reaction between hydrogen sulfide and sulfur dioxide takes place immediately. Lower concentrations of organic solvents may be employed but the reaction rate is usually slower and the overall efficiency of the process may be correspondingly diminished unless this effect is compensated by more expensive modifications in process equipment and operation. The preferred concentration of organic solvent in water solution entering an absorber is about 96 to 99% by weight. The small amount of water present in the concentrated solution exercises its well-known catalytic effect on the reaction. However, the absorption by the organic solvents of the water produced by the reaction and the water absorbed from the inlet sour gas stream causes immediate diminution of the effect of such water upon the reaction rate insofar as there is any tendency for the presence of excess water to prevent the reaction from going to completion. In this respect, the solvents of the type defined above actualy aid the reaction and force it to completion by removing one of the products, water, as it is formed.

Among the organic solvents which can be used in the process of this invention are the following:

Mercaptoethanol
Tetrahydropyran-2-methanol
Ethylene glycol
Diethylene glycol
Triethylene glycol
Tetraethylene glycol
3-thiapentanediol-1,5 (thiodiglycol)
Propylene glycol
Dipropylene glycol
3-methylpentanediol-1,5
Pentanediol-1,5
2-ethylhexanediol-1,3
Hexylene glycol
Octylene glycol
2-ethoxymethyl-2,4-dimethyl-pentanediol-1,5
2-methoxymethyl-2,4-dimethyl-pentanediol-1,5
2-methoxyethyl acetate
2-ethoxyethyl acetate
2-(2-ethoxyethoxy)ethyl acetate
2-(2-butoxyethoxy)ethyl acetate
Triethylene glycol monomethyl ether acetate
Ethylene glycol diacetate
Diethylene glycol diacetate
Di(2-methoxyethyl)maleate
Propylene carbonate
Diacetone alcohol
Acetonylacetone
Diethylene glycol diethyl ether
Ethylene glycol monomethyl ether
Ethylene glycol monoethyl ether
Ethylene glycol monobutyl ether
2-ethylbutyl 2-hydroxyethyl ether
Ethylene glycol mono-n-hexyl ether
Diethylene glycol monomethyl ether
Diethylene glycol monoethyl ether
Diethylene glycol monobutyl ether
Triethylene glycol monoethyl ether
Diethylene glycol mono-n-hexyl ether
Tetraethylene glycol dibutyl ether
Ethylene chlorhydrin
Propylene chlorhydrin
Polyethylene glycol chloride of molecular weight from 90 to 210
α-Methylbenzyl 2-hydroxyethyl ether
Diethylene glycol monophenyl ether
3-methoxybutanol
1,3-butylene glycol
1,4-butanediol Preferred among these solvents are the glycols, particularly diethylene glycol, triethylene glycol and propylene glycol, and ethers and esters thereof.

For a more complete understanding of the invention, reference is made to the drawings in which:

FIG. 1 is a flow diagram of a sweetening process and apparatus embodying the present invention;

FIG. 2 is a flow diagram of a modified sweetening process and apparatus;

FIG. 3 is a flow diagram of another modification;

FIG. 4 is a flow diagram of a fourth modification;

FIG. 5 is a flow diagram of a fifth modification of a sweetening process and apparatus in accordance with this invention;

FIG. 6 is a flow diagram illustrating a method and apparatus for recovering elemental sulfur from a sweetening process;

FIG. 7 is a flow diagram of another sulfur recovery method and apparatus;

FIG. 8 is a flow diagram illustrating the sulfur recovery method of FIG. 7 with modified apparatus;

FIG. 9 is a flow diagram of a complete sweetening and sulfur recovery process and apparatus;

FIG. 10 is a flow diagram of another complete sweetening and sulfur recovery procedure and apparatus in accordance with this invention;

FIG. 11 is a flow diagram of a complete sulfur recovery process for treating gas containing a high proportion of carbon dioxide and a relatively small proportion of hydrogen sulfide wherein the residue gas is relatively worthless and is vented;

Figure 12:
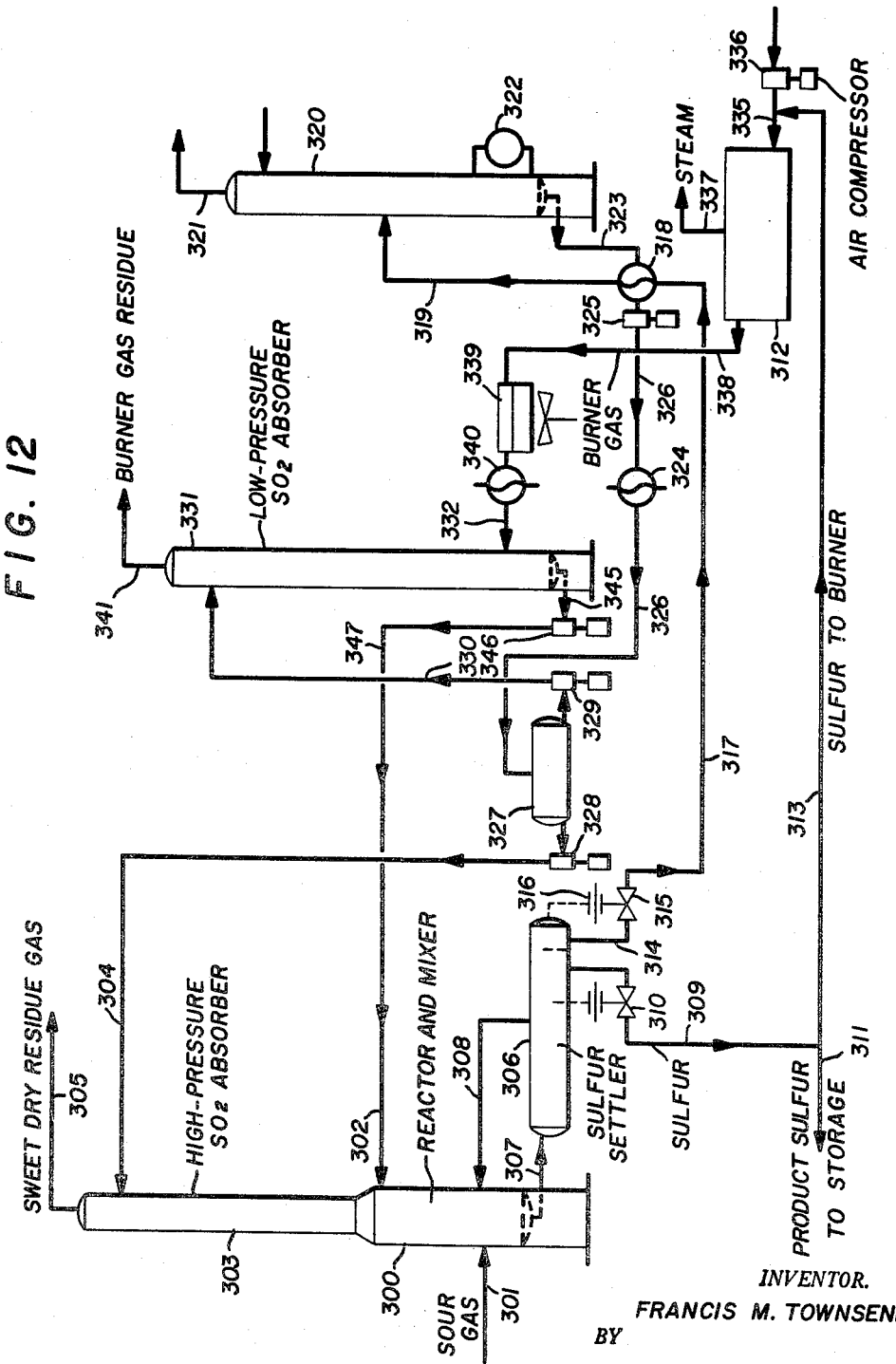
FIG. 12 is a flow diagram of a process and apparatus for sweetening and dehydrating gas for pipeline sale.

The apparatus of this invention is very flexible and may be operated with several variations. The sulfur dioxide may be pumped and dispersed into the sour gas entering the reactor, there to be contacted by and absorbed in a descending stream of aqueous solution of organic solvent. Or the sulfur dioxide may be introduced into the reactor at a point substantially below the concentrated organic solvent solution inlet, there to mix and react with the ascending sour gas. Or the sulfur dioxide may first be dissolved in a portion of the total stream of organic solvent and then pumped into the reactor at a point substantially below the inlet of the remaining portion of the organic solvent solution. Regardless of the procedure and apparatus selected, the reaction takes place immediately and elemental sulfur is precipitated and dispersed in the descending solution.

Sulfur dioxide is soluble in aqueous, concentrated solutions of the organic solvents of the class defined herein. the solubility is such that sulfur dioxide may be substantially stripped from a carrier gas by contacting it with a concentrated, sulfur dioxide-free aqueous solution of such an organic solvent in a countercurrent absorber. However, for best results, the concentration of sulfur dioxide in the solution should be restricted to 10% by weight, or less, in order to minimize the vapor pressure of the sulfur dioxide solution and possible resulting losses of sulfur dioxide due to its tendency to vaporize and escape.

The reaction between sulfur dioxide and hydrogen sulfide in an aqueous organic solvent can be conducted in a variety of ways and in a variety of equipment. One method is illustrated in FIG. 1 of the attached drawings, wherein the sulfur dioxide-free organic solvent solution, which may be a regenerated, recycled solution, is split into two portions. One portion of this solution is introduced into the top of a sulfur dioxide absorber 22, there to effect recovery of this component from the residue gas. The sulfur dioxide required for the reaction with hydrogen sulfide is added to the remaining portion of the organic solvent and this stream is introduced into the top of a reactor 23 where it joins the sulfur dioxide-laden solvent from the absorber 22 and effects the reaction between hydrogen sulfide and sulfur dioxide to produce elemental sulfur.

A second design for conducting the sweetening reaction is shown in FIG. 2. All of the concentrated sulfur dioxide-free organic solvent is introduced into the top of a sulfur dioxide absorber 22, there to effect recovery of this component from the residue gas. Liquid sulfur dioxide is pumped into the top of a reactor 23 where it mixes with sulfur dioxide-laden organic solvent from the absorber 22. The resulting sulfur dioxide-solvent mixture descends through the reactor 23 and contacts the ascending sour gas, thereby effecting reaction between hydrogen sulfide and the sulfur dioxide.

A third modification is illustrated in FIG. 3, wherein the required quantity of sulfur dioxide, in either vapor or liquid form as required, is added to the stream of sour gas entering a reactor 23, and the entire stream of concentrated sulfur dioxide-free organic solvent is introduced into the top of a sulfur dioxide absorber 22, there to recover an excess of this component from the residue gas. The sulfur dioxide-laden solvent issuing from the absorber 22 is introduced into the top of the reactor 23 to effect the reaction between the hydrogen sulfide and the sulfur dioxide.

A fourth method and apparatus for this invention is shown in FIG. 4, wherein sulfur dioxide-free organic solvent is introduced into the top of a sulfur dioxide absorber 22, there to recover the excess of this component from the residue gas. The sulfur dioxide-rich solvent is removed from the absorber 22 and heated in a still 24 and a reboiler 25 to strip the volatile components, including the sulfur dioxide, from the solvent. If the sour gas contains mercaptans, these are taken up by the organic solvent in the absorber 22 and stripped as volatile material in the still 24. The reconcentrated solvent is cooled in a heat exchanger 26 and pumped back to the top of the sulfur dioxide absorber 22, thus completing the cycle. A second separate stream of the same (or a different) sulfur dioxide-free solvent is used to effect solution of the sulfur dioxide stripped from the first solution above and introduced into the top of a reactor 23 to effect reaction between hydrogen sulfide and sulfur dioxide, the remainder of the required sulfur dioxide being introduced meanwhile into the reactor 23 by any one of the three methods recited above.

A fifth design, shown in FIG. 5, comprises means for introducing the required amount of sulfur dioxide-free concentrated organic solvent into the top of a first sulfur dioxide absorber 22, there to recover the excess of this component from the residue gas, which quantity may be substantially all or only a portion of the total solvent requirement for the process, means for removing said sulfur dioxide-enriched solvent from the bottom of the first absorber 22 and introducing it into a second sulfur dioxide absorber 27 to effect solution of any additional sulfur dioxide required in the reaction, means for pumping the required quantity of the same sulfur dioxide-free solvent to the top of the second absorber 27 to effect recovery of traces of sulfur dioxide from the flue gas passing upward through this vessel, means for combining the two solvent streams within the second absorber 27 into a single solvent stream in which is dissolved the sulfur dioxide required by the process, which stream is introduced into the top of a reactor 23 to effect the reaction between hydrogen sulfide and the sulfur dioxide, thereby producing elemental sulfur.

It is apparent that in the foregoing descriptions the sulfur dioxide absorber 22 may be superimposed on top of the reactor 23, either as a single pressure vessel comprised of the two separate and distinct sections, or the superimposed assembly may be two separate vessels connected by suitable piping permitting gravity flow of the solvent from the absorber to the reactor, or the two vessels may be set on a common elevation and the transfer of solvent from the absorber to the reactor may be effected by pumping through suitable connecting piping.

The reaction between hydrogen sulfide and sulfur dioxide is exothermic and, in any of the preferred forms of the invention listed above, the temperature rise in the reactor due to heat of the reaction may be limited and/or controlled if desired. For example, the extent of the temperature rise, based on sour gas entering the reactor at 80° F., contacting 98% diethylene glycol and sulfur dioxide as solvent entering the reactor at 100° F., and solvent concentration at the reactor outlet reduced to 95% by weight, is listed as follows.

| Percent $H_2S$ in gas: | Max. reactor temperature |
|---|---|
| 1 | 120 |
| 10 | 202 |
| 20 | 217 |
| 40 | 226 |

If solvent concentration is decreased below 95 percent by weight, resulting from decreasing the quantity of solvent charged, the maximum temperatures will increase proportionately.

FIG. 6 is a flow diagram of one of the preferred designs for effecting separation of the elemental sulfur from the solvent, comprising means for maintaining the temperature of a reactor 23 in the range 100–150° F., for example, by use of reactor intercoolers (not shown), means for discharging the sulfur-laden slurry from the base of the reactor 23 to a sulfur heating and settling tank 28, means for applying heat to said tank 28 in quantity sufficient to control the temperature of its contents in the range 250–275° F., means for agglomerating and melting the sulfur particles and effecting separation of the slurry into a molten sulfur phase and an aqueous organic solvent phase, means for discharging the sulfur from the bottom of the settling tank 28 to storage or to a sulfur burner (not shown) as required, means for discharging the solvent to a still (not shown) for reconcentration, and means for discharging the sulfur dioxide vapors stripped from the slurry into the reactor 23 or into a sulfur dioxide absorber (not shown) for recovery and re-use by solution in the concentrated solvent.

Another embodiment of apparatus for separating elemental sulfur from the solvent is illustrated in FIGS. 7 and 8, and comprises means for maintaining the reactor temperature in the desired range, means for flowing the sulfur-laden slurry from the base of a reactor 23 by gravity into a sulfur melting and settling tank 28 which is connected to the reactor 23 by means of liquid and vapor flow and equalizing conduits (not shown) so that the two vessels operate at the same pressure, means for applying heat to the settling tank 28 in quantity sufficient to maintain the temperature of its contents in the range 250–275° F., means for agglomerating and melting the sulfur particles and effecting separation of the slurry into a molten sulfur phase and an aqueous organic solvent phase, means for discharging the sulfur from the bottom of the tank 28 to storage or to a sulfur burner (not shown) as required, means for discharging the organic solvent to a still (not shown) for reconcentration, and means for discharging the sulfur dioxide stripped from the slurry back to the reactor 23 for use in that zone.

It will be understood that in the above descriptions the reactor 23 and the sulfur melting and settling drum 28 may operate at the same or different pressures. It is anticipated that the reactor 23 shall operate at any pressure required by the gas system it serves, but the sulfur melting and settling drum 28 may operate at the same pressure or at a lower pressure, such as from 10 to 30 p.s.i.g., which pressure will be adequate to supply the necessary driving force to deliver the various streams to the desired points. In the second arrangement discussed above for separating elemental sulfur, the sulfur melting and settling drum 28 can be an integral part of the reactor 23 if the capacity of the lower portion of that vessel is of adequate size, or the reactor 23 can be erected in a vertically disposed position at the center of the horizontally disposed melting and settling tank 28 with both vertical and horizontal portions fabricated into a single vessel, or the reactor 23 and the melting and settling tank 28 can be two separate vessels properly located with respect to each other and connected with a lower line to deliver slurry from the reactor 23 to the melting and settling drum 28, and a second line to deliver stripped sulfur dioxide vapors from the settling drum 28 to the vapor section of the reactor 23. In any of these alternatives, both vessels would operate at reactor pressure which, as stated above, is equal to the pressure of the gas system it serves.

The organic solvent from which the sulfur has been removed, contains excess water absorbed from the entering stream of sour gas and water from the reaction. This can be readily removed by further heating the solution and discharging it into a still whose base is maintained in the temperature range 250–500° F., depending on the particular organic solvent employed and the extent of reconcentration desired. Excess water passes overhead in the vapor form. The vapor may be cooled and the water condensed and removed from the system. The reconcentrated solution of organic solvent is withdrawn from the bottom of the still, cooled by heat exchange and pumped back to the absorber, thereby constituting a continuous process.

The apparatus shown in FIGS. 9 to 11, inclusive, is described in detail in the examples which follow.

In FIG. 12 there is shown a reactor 300 to which sour gas is supplied via an inlet 301. The sour gas rises through the gas-liquid contacting devices of the reactor 300 countercurrent to a downward flow of organic solvent solution, for instance, a solution of sulfur dioxide in 98% triethylene glycol. In this apparatus, in addition to the removal of sulfur from sour gas, water is removed to produce sweet dehydrated residue gas for pipeline sale. The sour gas enters the lower portion of the reactor 300 at line pressure and atmospheric temperature. The solution of sulfur dioxide in organic solvent is pumped into the top of the reactor via a line 302. Upon contact between the sour gas and the sulfur dioxide in the presence of the organic solvent, reaction occurs forming sulfur and water. Sulfur is insoluble in the organic solvent but the water is absorbed. The amount of solvent supplied to the reactor 300 is in sufficient quantity so that the water concentration increases to only about 5% of the weight of the glycol upon absorbing all the water produced by the reaction and absorbing all of the water vapor content of the inlet gas. The sweetened gas from which the hydrogen sulfide and water have been removed rises from the reactor 300 into the high pressure sulfur dioxide absorber 303 where it is contacted by a descending stream of concentrated (preferably at least 98%) organic solvent (free of sulfur dioxide) which is introduced to the absorber 303 via an inlet 304 near the top thereof. The concentrated solvent absorbs any excess of sulfur dioxide remaining in the sweetened gas and any traces of water therein and passes downward into the reactor 300. Sweet dry residue gas passes from the top of the absorber 303 via line 305.

The exothermic reaction and the counterflow design of the reactor 300 combined to produce a temperature gradient in this vessel which increases toward the base thereof, thereby providing a rate of reaction which is highest at the relatively hot base of the reactor 300, while complete conversion of the hydrogen sulfide to sulfur is accomplished in the cooler upper portion of the reactor 300. The slurry of sulfur and dilute organic solvent which collects at the base of the reactor 300 is conducted to a settling tank 306 and in the settling tank 306 the mixture is heated to a temperature in the range of 250–275° F. by a heating means (not shown). The heating of the slurry strips off excess sulfur dioxide from the solution and this is returned to the bottom of the reactor 300 via a line 308. The sulfur particles in the sulfur settler 306 are melted and liquid sulfur which collects near the bottom of the settler 306 is removed via a line 309 and a control valve 310. Part of the sulfur is withdrawn to storage via a line 311 and part of it is conducted to a burner 312 via a line 313. The organic solvent is decanted from the sulfur settler 306 via a line 314 and a valve 315 controlled by a controller 316. This organic solvent containing water passes through line 317 and through a heat exchanger 318 where it is heated. From the heat exchanger 318 it passes via a line 319 into a solvent still 320 where the excess of water is removed by evaporation from the solvent and the latter is concentrated to about 98% concentration or greater. The water is discharged from the still 320 via a vent 321. As the glycol descends the still 320, it becomes more concentrated as the temperature rises and excess water is vaporized and removed. At the base of the still 320, the solvent is heated by a reboiler 322 to a temperature corresponding to the desired concentration of solvent at the column pressure. The solvent is then discharged from the still 320 via a line 323 to the heat exchanger 318 where heat is released to incoming solvent. The solvent passed through a pump 325, line 326, and cooler 324 to a surge tank 327 where solvent is stored and withdrawn as needed. Solvent from the surge tank 327 is impelled by a pump 328 and passes through line 304 to the top of the high pressure absorber 303. Another portion of the solvent is removed from the surge tank 327 via a pump 329 and passes through a line 330 to the top of a low pressure sulfur dioxide absorber 331. In the low pressure absorber 331 the concentrated solvent descends the column countercurrent to a stream of sulfur dioxide containing gas which enters through line 332 connecting near the bottom of absorber 331. The sulfur dioxide which enters the absorber 331 is produced in the sulfur burner 312 which is provided with compressed air from a compressor 336 which is passed into the sulfur burner 312 via the line 335. The sulfur is oxidized to sulfur dioxide in the burner 312 and the heat of combustion of the sulfur in the burner 312 may be used to produce steam which can be drawn off for other uses via a line 337. Combustion gas from the burner 312 passes via a line 338 to a cooler 339 and a heat exchanger 340 from which it passes via a line 332 into the bottom of the low pressure absorber 331. The gas containing sulfur dioxide passes upward in the absorber 331 where it is contacted with and absorbed by the concentrated glycol solvent which descends therein. The waste residue gas passes out through a vent 341 at the top of absorber 331. The organic solvent containing sulfur dioxide collects near the bottom of the absorber 331 and is drawn off via an outlet 345 where it passes through a pump 346 and a line 347 to the inlet 302 into the reactor 300.

The apparatus shown in FIG. 12 has the advantage that sulfur dioxide can be lost at but three points. One point is that at the top of the high pressure absorber 303. Another point is that at the vent 341 at the top of low pressure absorber 331 and the third point is at the vent 321 at the top of the glycol still 320. It is apparent from FIG. 12 that very high recovery efficiency for sulfur may be obtained with this design.

Figure 13:
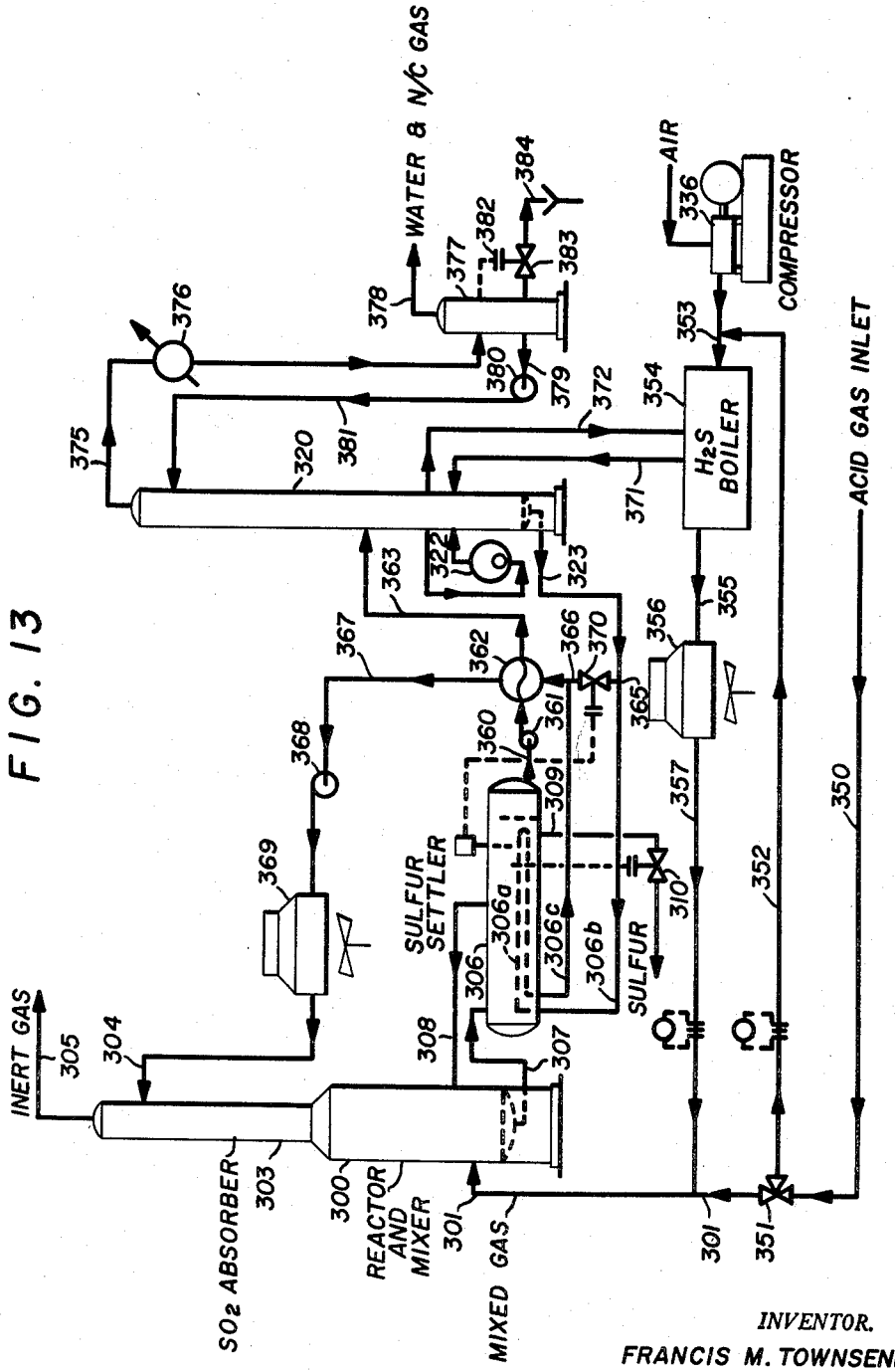
FIG. 13 is a flow diagram of a process and apparatus for recovering sulfur from acid gases produced by an amine-type sweetening plant.

FIG. 13 shows an apparatus which may be employed to recover sulfur from sour gases produced by an amine-type sweetening plant. Referring to this figure it is seen that the sour gas stream enters the system through a line 350 and is divided into two portions by a three-way valve 351. One portion comprising one-third of the total acid gas stream passes via a line 352 to a line 353 where the acid gas is admixed with a stream of air from a compressor 356. The mixture of air and acid gas in line 353 passes into a burner and boiler 354 where the hydrogen sulfide of the acid gas is oxidized to sulfur dioxide. The gas stream containing the sulfur dioxide thus produced passes through a line 355, a cooler 356 (where the gas temperature is reduced to 120° to 130° F.) and a line 357 to rejoin the main portion of acid gas stream which passes from the three-way valve 351 via a line 301 to the lower part of a reactor 300 where it ascends countercurrent to a stream of concentrated organic solvent which enters the reactor 300 through an absorber 303. The hydrogen sulfide and sulfur dioxide in the mixed gas stream which enters the reactor 300 via line 301 react in the presence of the organic solvent in the reactor 300, thereby producing sulfur and water, the latter being absorbed by the organic solvent. The inert portions of the gas stream pass up through the absorber 303 where they are contacted with fresh concentrated organic solvent and any remaining traces of sulfur dioxide are removed by the solvent. Thereafter the inert gas is discharged via a vent 305. Concentrated solvent enters the absorber 303 via an inlet 304 near the upper part thereof and passes downward to the reactor 300. Sulfur formed by the reaction of hydrogen sulfide with sulfur dioxide collects near the bottom of the reactor 300 and is drawn off as a slurry with solvent through a line 307 leading to a sulfur settler 306. The slurry in the sulfur settler 306 is maintained at a temperature of 250 to 275° F. by means of a closed heating coil 306a to which hot solvent is supplied via lines 306b and 306c connected to a solvent still 320. At a temperature of 250 to 275° F. the sulfur in the sulfur settler 306 is molten and may be withdrawn in liquid form via a line 309 and a control valve 310 to sulfur storage. Any sulfur dioxide in the organic solvent in the settler 306 is evaporated and passes out of the sulfur settler 306 via a line 308 whence it is returned to the reactor 300 for further reaction with the hydrogen sulfide of the sour gas. Dilute solvent from the sulfur settler 306 is drawn off via a line 360 and a pump 361, through a heat exchanger 362 where heat is absorbed from freshly concentrated solvent passing through the heat exchanger from the still 320. The dilute solvent from the exchanger 362 passes via a line 363 to a glycol still 320 where the solvent is concentrated by boiling off most of the water to raise the solvent to a suitable concentration, preferably at least 98%. Concentrated hot solvent collects near the bottom of the still 320 and is withdrawn via an outlet 323. At a T 365 the hot solvent stream is divided and part passes via the line 306b through the closed coil 306a in the sulfur settler 306 to supply heat to the latter. This solvent then passes via the line 306c to a line 366 where it passes through the heat exchanger 362 and then via a line 367 and a pump 368 to a cooler 369 where its temperature is lowered to the proper temperature for reaction. From the cooler 369 it passes via the line 304 to the absorber 303. The valve 370 in the line 366 controls the relative quantity of glycol passing through the coil 306a and passing directly to the heat exchanger 362.

Returning now to the hydrogen sulfide burner 354, wherein the hydrogen sulfide contained in one-third of the acid gas stream is oxidized with air, the heat from the burner may be used to generate process steam or used to reconcentrate the organic solvent employed in the process and apparatus. Steam from the boiler 354 passes via a line 371 to the solvent still 320 and the condensate is returned via a line 372. A reboiler 322 is connected to the solvent still 320 to provide additional heat for evaporation of the water in the dilute solvent which enters the still via the line 363. The overhead from the solvent still 320 passes via a line 375 and a condenser 376 to a separator 377. Uncondensed gases and some water vapor are discharged via a vent 378, while condensed water collects near the bottom of the separator 377 where it is withdrawn via a line 379 and a pump 380 from whence it passes via a line 381 back to the top of the still 320 as reflux. A controller 382 regulates a valve 383 to discharge excess water from the system through the line 384.

In the apparatus of FIG. 13 it is important to note that by splitting the acid gas stream into two portions, one being one-half as great as the other, passing the smaller portion to the burner and boiler 354 for oxidation with air and then returning the oxidized gas stream containing sulfur dioxide back to join the larger stream of acid gas, there is thus obtained the stoichiometric proportions of hydrogen sulfide and sulfur dioxide required for the complete reaction of these materials to produce sulfur and water. In this way the appropriate amount of sulfur dioxide required for the complete conversion of the sulfur dioxide is retained in and recycled between the reactor 300 and the absorber 303. This is a feature which substantially contributes to the improvement of the sulfur recovery efficiency since excess sulfur dioxide required for complete reaction is retained in the system at all times.

If the acid gas stream supplied to the apparatus of FIG. 13 contains a high content of carbon dioxide so that oxidation is difficult or impossible in the burner and boiler 354, then hydrocarbon gas, either sweet or sour, may be mixed with the acid gas supplied to the burner 354 in a quantity sufficient to insure combustion.

Figure 14:
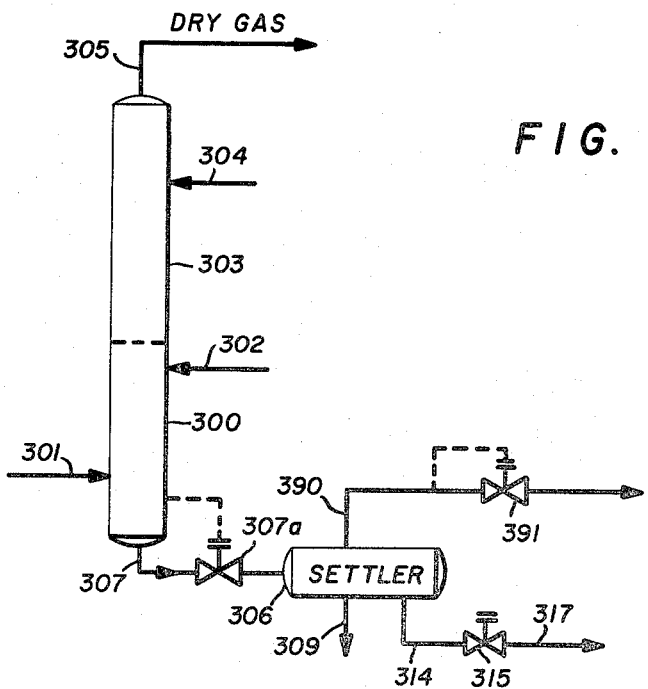
FIG. 14 is a flow diagram of a process and apparatus for recovery of sulfur from gas in accordance with this invention, with provision to retain all sulfur dioxide in the system.

FIG. 14 illustrates a modification of the apparatus which is particularly adaptable to natural gas. This system retains all of the excess sulfur dioxide so that none is wasted by venting the excess of sulfur dioxide to a low pressure absorber, thereby providing high efficiency. Introduction of a control valve between the reactor and settler permits a low pressure settler to be used. In FIG. 14 the sour gas enters via an inlet 301 to the reactor section 300 where it is contacted with a countercurrent stream of organic solvent (e.g., triethylene glycol) containing sulfur dioxide which is introduced through an inlet 302. The hydrogen sulfide is removed by reaction with the sulfur dioxide and the sweetened gas stream passes upward to the absorber section 303 wherein traces of sulfur dioxide remaining in the gas stream are removed by a countercurrent stream of solvent. The sweetened gas passes out of the apparatus via a line 305 and the solvent enters the absorber via an inlet 304. The slurry of sulfur in dilute solvent is removed from the reactor section 300 from the bottom thereof via a line 307 and a control valve 307a leading to a low pressure settler 306 where molten sulfur is separated as previously described and removed via line 309. The sulfur dioxide is flashed off via a line 390 and a valve 391 leading to low pressure sulfur dioxide absorber (not shown) wherein the sulfur dioxide gas stream is contacted with concentrated organic solvent which is then recirculated via an apparatus (not shown) through an inlet 302. The control valve 307a prevents return of sulfur dioxide to the reactor section 300. The solvent is withdrawn from the settler 306 via a line 314 and a control valve 315 whence it passes via a line 317 to a solvent still (not shown).

Figure 15:
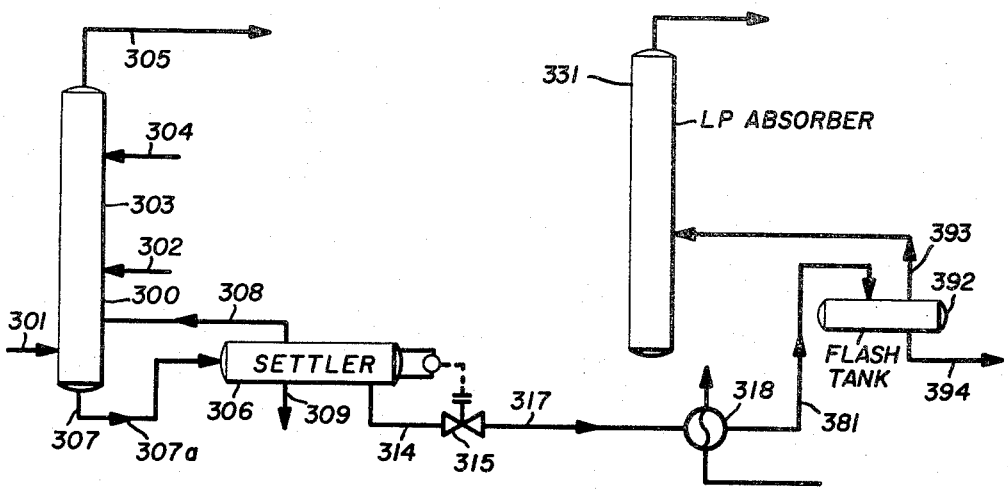
FIG. 15 is a modification of the apparatus of FIG. 14.

FIG. 15 illustrates another modification of the apparatus providing high efficiency of sulfur dioxide recovery. In this figure the reactor section 300 and the absorber section 303 of the apparatus are as shown in FIG. 14, the only difference being that a line 308 leads from the settling tank 306 to the reactor section 300 to return sulfur dioxide which is evaporated in the settler tank. Sour gas enters the system through an inlet 301, rises through the reactor section 300 and the absorber section 303 and is released for pipeline sale via a line 305. A solution of sulfur dioxide in organic solvent is introduced through an inlet 302 and concentrated organic solvent enters through an inlet 304. The resulting slurry of sulfur in diluted solvent which collects at the bottom of the reactor section 300 is removed via a line 307 and a valve 307a to a settler (high pressure) 306. Molten sulfur is removed from the settler 306 via a line 309. The diluted organic solvent is removed from the settler 306 via a line 314, control valve 315, a line 317, through a heat exchanger 318 where heat is absorbed and via a line 381 to a flash tank 392 where the sulfur dioxide remaining in the solvent is vaporized and passes out through a line 393 to a low pressure sulfur dioxide absorber 331 where, along with sulfur dioxide from sulfur burner flue gas, it is absorbed in concentrated organic solvent. The low pressure absorber 331 is connected via suitable tubing and a pump (not shown) to the inlet 302 to reactor section 300 to return solvent and sulfur dioxide to the reaction section. Solvent from the flash tank 392 is removed via a line 394 wherein it passes to a solvent still (as shown in FIG. 12) for reconcentration and recycling.

Figure 16:
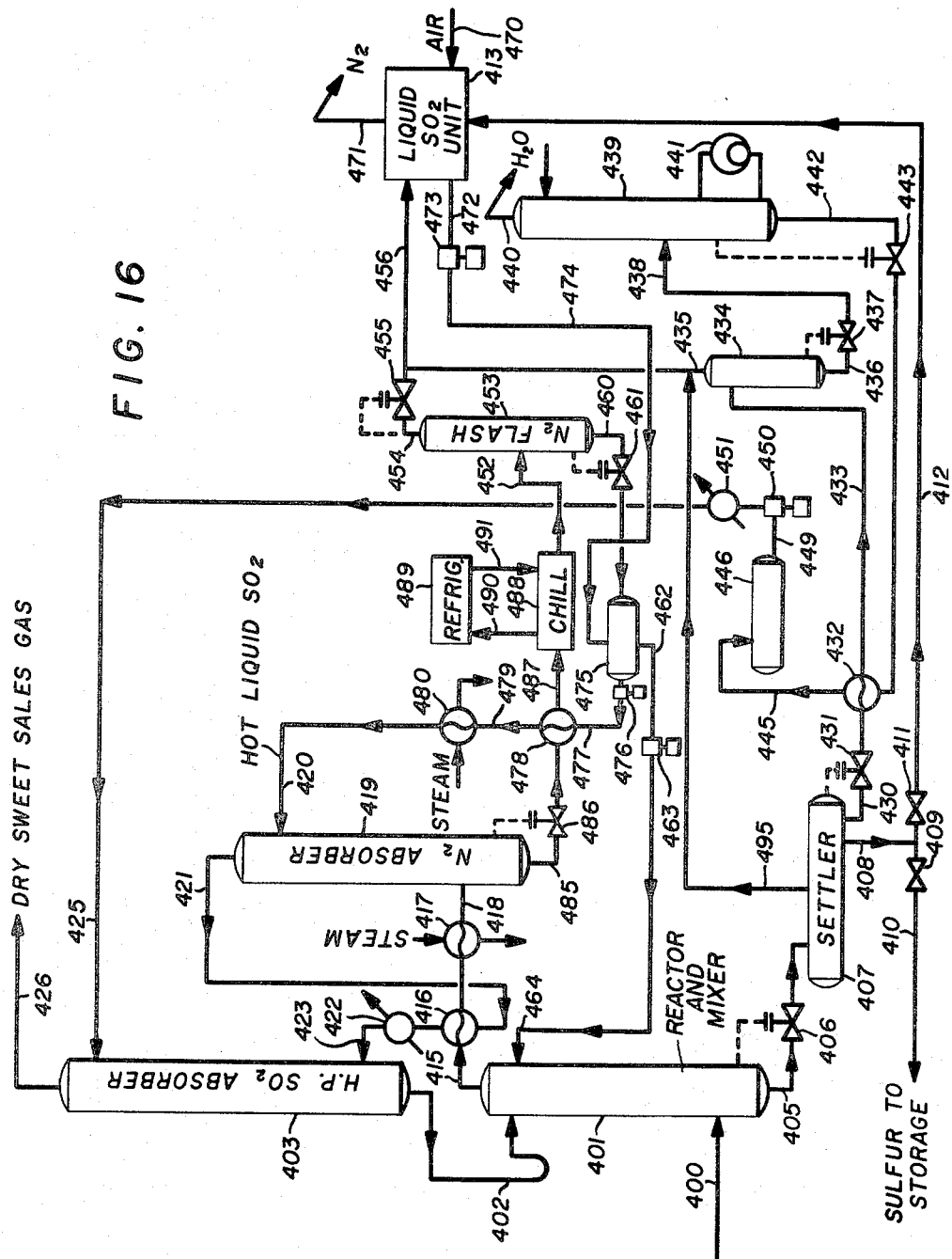
FIG. 16 is a flow diagram of a process and apparatus for recovery of sulfur and nitrogen from a gas containing these compounds.

Turning now to FIG. 16 there is shown a modified apparatus for removing hydrogen sulfide from a gas stream containing a large percentage of inert gas such as nitrogen. This apparatus is applicable to a gas stream containing, for example, 5% hydrogen sulfide, 7% carbon dioxide, 32% nitrogen and the rest gaseous hydrocarbons, having a low calorific content of 616 B.t.u. per cubic foot. In FIG. 16 the sour gas stream enters a reactor 401 via a line 400 connected near the bottom thereof. The sour gas rises in the reactor 401 contacting a descending current of organic solvent containing sulfur dioxide which enters the reactor 401 via a line 402 near the top thereof and connected to the bottom of a high pressure sulfur dioxide absorber 403. In the reactor 401 the hydrogen sulfide and sulfur dioxide react to form water and elemental sulfur which descend to the bottom of the reactor 401 as a slurry with the organic solvent. This slurry is withdrawn via a line 405 and passes through a control valve 406 to a sulfur settler 407. In the settler 407 the sulfur is separated from the diluted organic solvent and the sulfur is withdrawn by a line 408 wherein part of it is withdrawn by a valve 409 and a line 410 to storage. The remainder of the sulfur is passed via a valve 411 and a line 412 to a liquid sulfur dioxide unit 413.

The sweetened gas passes from the reactor 401 via a line 415 through heat exchangers 416 and 417 where it is heated and then to an inlet 418 to a nitrogen absorber 419. The gas stream passes upward in the nitrogen absorber 419 where it is contacted with a stream of hot liquid sulfur dioxide which enters near the top of the nitrogen absorber 419 through a line 420. Nitrogen is absorbed by the hot liquid sulfur dioxide and the gas stream free of nitrogen passes out of the nitrogen absorber 419 through the top thereof via a line 421 where it passes through the heat exchanger 416 and releases part of its heat to the gas stream in line 415 and passes then through a cooler 422 in the line 423 and thence to the bottom of the high pressure sulfur dioxide absorber 403, wherein the sulfur dioxide contained in the gas entering via line 423 is absorbed by countercurrent contact with a descending stream of concentrated organic solvent which enters the absorber 403 via a line 425. From the top of the high pressure sulfur dioxide absorber 403 the sweetened gas passes out via a line 426. This gas has had the hydrogen sulfide, nitrogen and sulfur dioxide removed therefrom and is now suitable for pipeline sale.

Returning now to the sulfur settler 407, it is seen that the dilute organic solvent contained therein is withdrawn via a line 430 and a control valve 431 to a heat exchanger 432 where heat is absorbed. Then the warm solvent passes via a line 433 to a flash tank 434 where the sulfur dioxide contained in the diluted solvent is flashed off at high temperature. The sulfur dioxide leaves the flash tank 434 via a line 435 and the dilute solvent passes out of the flash tank 434 via a line 436, a control valve 437 and a line 438 leading to a solvent still 439. In the still 439 the water contained in the solvent is evaporated at high temperature and is vented from the top of the still 439 via a vent line 440. A reboiler 441 is connected to the still 439 to supply heat thereto. Concentrated solvent, preferably of 98% concentration or greater, is removed from the bottom of the still 439 via a line 442 and a control valve 443 to the heat exchanger 432 where heat is released to the dilute solvent from the sulfur settler 407. Cooled solvent then passes via a line 445 to a surge tank 446 where it may be stored and withdrawn as needed. Solvent as required in the operation is withdrawn by a line 449, a pump 450 and a cooler heat exchanger 451 to the inlet 425 near the top of high pressure sulfur dioxide absorber 403.

Turning now to the liquid sulfur dioxide unit 413 which is supplied with sulfur via a line 412, it is seen that a stream of air is passed into the unit 413 via an inlet 470 to provide oxygen to oxidize the sulfur to sulfur dioxide. The sulfur dioxide thus formed is liquified by compression with conventional apparatus (not shown) and the nitrogen and other unabsorbed gases contained in the gas stream are vented via an outlet 371. The liquid sulfur dioxide passes via a line 472 and a pump 473 to a line 474 leading to a liquid sulfur dioxide surge tank 475 where the liquid sulfur dioxide is stored and withdrawn as required by a pump 476 and a line 477 passing through a heat exchanger 478 where heat is absorbed, a line 479 and a second heat exchanger 480 where the liquid sulfur dioxde is heated with steam to appropriate temperature. From the last heat exchanger 480 the hot liquid sulfur dioxide passes via a line 420 to the top of the nitrogen absorber 419. Liquid sulfur dioxide containing nitrogen dissolved therein is removed from the bottom of the nitrogen absorber 419 via a line 485 and a controller 486 through the heat exchanger 478 where heat is released to the liquid sulfur dioxide in the line 477. From the heat exchanger 478 the liquid sulfur dioxide containing nitrogen passes via a line 487 to a chiller 488 which is connected to a referigerating unit 489 by suitable piping 490 and 491. The chilled stream of sulfur dioxide liquid containing nitrogen passes via a line 452 to a nitrogen flash tank 453 where the nitrogen is flashed from the liquid sulfur dioxide. The nitrogen gas leaves the flash tank 453 via a line 454 and a back-pressure valve 455 and passes into the liquid sulfur dioxide unit via a line 456. Any sulfur dioxide contained in the nitrogen gas in line 456 is recovered in this unit and the excess of nitrogen is exhausted via the vent 431. Liquid sulfur dioxide from the nitrogen flash tank 453 is withdrawn by a connection 460 near the bottom of the tank 453 and leading through a control valve 461 to the liquid sulfur dioxide surge tank 435. Liquid sulfur dioxide is also removed from the surge tank 435 via a line 462 and a pump 463 where it passes to the reactor 401 and enters through an inlet 464 connected near the top thereof. The sulfur dioxide which enters the reactor 401 via the inlet 464 is so controlled as to provide additional sulfur dioxide as may be required to supplement that entering the reactor via the line 402.

In the sulfur settler 407 the temperature of the slurry of sulfur in dilute solvent is adjusted to 250 to 275° F. and excess sulfur dioxide in the slurry is stripped out in the settler 407 and passes via a line 495 which connects with the line 435 and conducts this excess of sulfur dioxide back to the liquid sulfur dioxide unit 413 via lines 435 and 456.

Figure 17:
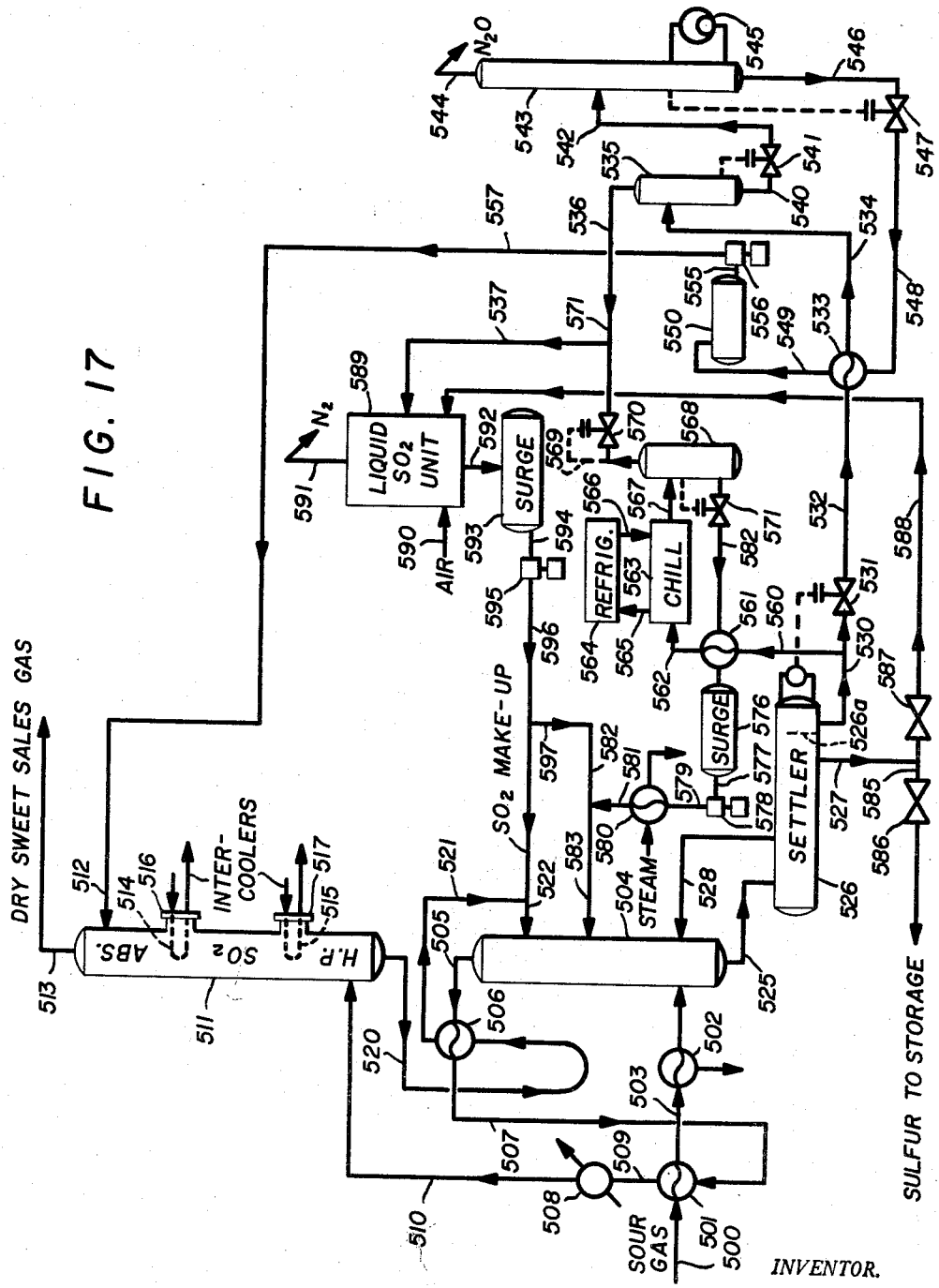
FIG. 17 is a flow diagram of a modified process and apparatus for recovery of sulfur and removal of nitrogen from a gas containing the same.

FIG. 17 shows a modification of the apparatus of FIG. 16 in which the reaction of hydrogen sulfide with sulfur dioxide and the absorption of nitrogen by liquid sulfur dioxide is conducted in the same reactor and absorber. A sour gas stream containing hydrogen sulfide and nitrogen enters the system via an inlet 500 and passes through heat exchangers 501 and 502 in line 503. The hot gas from line 503 enters the reaction vessel 504 near the bottom thereof and is contacted with a hot countercurrent stream of organic solvent and liquid sulfur dioxide. The purified gas stream leaves the vessel 504 via a line 505 connected to the top thereof and passes through a heat exchanger 506, a line 507, the heat exchanger 501, a cooler 508, a line 509 and a line 510 to enter the bottom of a high pressure sulfur dioxide absorber 511 where the purified gas ascends countercurrent to a stream of concentrated organic solvent which enters the high pressure absorber 511 via a line 512 connected near the top thereof. The descending stream of organic solvent removes any traces of sulfur dioxide and water which may be in the gas stream and the sweet dry gas stream passes out of the absorber 511 via a line 513. The high pressure absorber 511 is suitably connected by flanges 516 and 517 to intercoolers 514 and 515 to regulate the temperature of the materials in the absorber 511. Concentrated organic solvent containing traces of sulfur dioxide collects near the bottom of the absorber 511 and passes via a line 520 through the heat exchanger 506 and a line 521 to a line 522 which conducts the solvent and sulfur dioxide to the vessel 504 for interaction with the sour gas stream. Near the bottom of the vessel 504 there is collected a slurry of elemental sulfur, diluted organic solvent and liquid sulfur dioxide. The slurry is withdrawn through a line 525 to a settler 526 where the sulfur is separated from the liquid and removed via a line 527. The settler 526 is provided with an overflow baffle 526a to aid in separation of sulfur and solvent by decantation. That part of the sulfur dioxide contained in the liquid in the sulfur settler 526 which is vaporized passes out of the sulfur settler 526 via a line 528 through which it is returned to the vessel 504. The diluted solvent and sulfur dioxide in the sulfur settler 526 are removed via a line 530 through a control valve 531 and a line 532 to a heat exchanger 533 where heat is absorbed from a hot solvent stream. The heated solvent and sulfur dioxide then pass through a line 534 to a sulfur dioxide flash tank 535 where the mixture is heated to a temperature sufficient to separate the sulfur dioxide from the solvent. The sulfur dioxide gas passes through a line 536 which connects to a line 537 leading to a liquid sulfur dioxide unit. The solvent free of sulfur dioxide is removed from the sulfur dioxide flash tank 535 via a line 540, a control valve 541 and a line 542 to a solvent still 543 where the water contained in the solvent is removed by distillation and vented through a line 544. Heat is supplied to the still 543 by a reboiler 545. The concentrated organic solvent is removed from the bottom of the glycol still 543 via a line 546, a control valve 547, and a line 548 to the heat exchanger 543 where heat is released to the dilute solvent passing through lines 532 and 534. The cool concentrated solvent is then passed via a line 549 to a solvent surge tank 550 where solvent is stored for withdrawal as required. Solvent is removed from the surge tank 550 via a pump 556 and lines 555 and 557, connecting to the inlet 512 on the high pressure sulfur dioxide absorber 511.

Part of the mixture of dilute organic solvent and sulfur dioxide which is removed from the sulfur settler 526 via the line 530 passes through line 560, a heat exchanger 561 and a line 562 to a chiller 563 connected to a suitable refrigeration unit 564 via lines 565 and 566. A chilled mixture of solvent and sulfur dioxide passes from the chiller 563 via a line 567 to a high pressure flash tank 568. The vented nitrogen containing some sulfur dioxide vapor then passes via a line 569 and a control valve 570 to a line 571 which connects with line 537 leading to the liquid sulfur dioxide unit. Solvent from the bottom of the tank 568 is removed via a line 570 and a control valve 571 to a line 572 leading to the heat exchanger 561 wherein heat is extracted from the solvent sulfur dioxide mixture entering from the line 560. From the heat exchanger 571 the solvent passes via a line 575 to a surge tank 576 where the glycol is stored and withdrawn via a line 577, a pump 578, a line 579 through a heat exchanger 580 wherein steam is used to impart heat to the solvent which then passes via a line 581 to a line 582 leading to an inlet 583 to the vessel 504 to provide hot recycle of solvent to the reactor.

Molten sulfur from the sulfur settler 526 is removed via a line 527. The sulfur stream is divided into two portions, one passing via a line 585 and a valve 586 to storage and the other passing via a valve 587 and a line 588 leading to the liquid sulfur dioxide unit 589. In the latter air enters a line 590 and the sulfur is oxidized to sulfur dioxide and compressed to form liquid sulfur dioxide. Nitrogen and inert gases in the air are vented from the liquid sulfur dioxide unit 589 via a vent 591. The liquid sulfur dioxide is then passed via a line 592 to a liquid sulfur dioxide surge tank 593 where the sulfur dioxide is stored and withdrawn as required. The sulfur dioxide is withdrawn through a line 594, a pump 595, and a line 596 leading to the inlet 522 near the top of the vessel 504. An alternative route is provided via the line 597 which leads to the inlet 583 on the vessel 504.

The liquid sulfur dioxide unit 589 is a conventional unit in which the sulfur is oxidized with air to sulfur dioxide and the gases are cooled and compressed to form liquid sulfur dioxide. The non-liquifiable gases, such as nitrogen and the inert gases of the atmosphere, are vented.

The following examples describe continuous processes which are conducted in apparatus of this invention in commercial operations. These examples are intended solely to illustrate the invention and not to limit it in scope. They are directed to specific materials, conditions and apparatus, but it will be apparent to those skilled in the art that many modifications may be made without departing from the invention.

*Example 1*

Referring now to FIG. 9 of the drawings, sour gas, which is usually saturated with water vapor, enters the bottom of a reactor 31 through an inlet line 32. The sour gas rises through the gas-liquid contacting devices of the reactor 31 countercurrent to the downward flow of solvent solution, for example a 98% triethylene glycol solution. The solvent enters the reactor 31 through an inlet 39 near the top of the upper, absorbing section of the reactor 31. Sulfur dioxide is admitted to the top of the reactor section 31 through an inlet line 38, located some distance below the solvent inlet 39. Where a bubble cap tower is employed, this may be from 10 to 25 trays below the solvent inlet, depending on the extent to which the sulfur dioxide must be removed from the residue gas.

The quantity of sulfur dioxide entering the reactor 31 should be so regulated that the molar ratio of hydrogen sulfide to sulfur dioxide in the reactor 31 is slightly less than 2 to 1. A lower ratio may be employed as a safeguard against the escape of any hydrogen sulfide in the processed residue gas.

It will be observed that in this embodiment all of the natural gas is in intimate contact with the absorbent, concentrated solution of organic solvent. Consequently, any moisture in the gas is removed along with hydrogen sulfide. The gas leaving through the outlet 42 at the top of the sulfur dioxide absorber section is therefore dry as well as free of hydrogen sulfide. The dried and sweetened gas is preferably passed through dual mist extractors 40 and 41 before leaving the column via the outlet 42 to minimize solvent loss by entrainment.

The dehydration of the sour gas and the chemical reaction between the dissolved sulfur dioxide and the rising stream of gas containing hydrogen sulfide takes place at a controlled temperature, preferably of 200° F. or less, largely in that part of the reactor between the sour wet gas inlet 32 and the sulfur dioxide inlet 38, denoted as the contact zone 33 in the drawing. Sulfur particles form in the solvent stream and are carried therein to the bottom or base 34 of the reactor column, whence the slurry is discharged through the outlet 35, preferably under the control of a liquid level controller 37 and motor valve 36. The organic solvent leaving the column through the line 35 is diluted by water absorbed from the sour gas and also by water from the reaction. The solvent concentration may be thereby decreased to about 90% or lower, although it is preferred that the concentration be held at 95% or higher. In order to remove both the excess water and the sulfur from the solvent solution, it is next subjected to heating to remove the sulfur, and then to distillation to remove the water.

After leaving the base 34 of the reactor column 31, the dilute solvent is passed via a line 43 through heat exchangers 44 in order to raise the temperature to about 250° F. and coagulate the suspended sulfur particles. From the heat exchangers the solvent is discharged through a line 46 into a sulfur receiver 45. This receiver is heated by a closed steam coil 47, or other suitable heat source, to a temperature of 250–275° F. The receiver temperature must be controlled with care because molten sulfur becomes very viscous at higher temperatures. Within this receiver 45, the partially coagulated sulfur settles into the molten sulfur phase which is withdrawn to storage through the discharge line 48 by means of a valve 49 which is regulated by an interface controller 50. The dilute solvent solution is withdrawn from the sulfur receiver 45 through a line 51, in substantially sulfur-free condition. It is subjected to a further heating in a heat exchanger 52 and a preheater 53, and then it is fed into a stripping column 54 via an inlet line 55.

Within the stripping column 54, excess water is removed from the solvent, and is discharged from the column at its top via a vent 56 which may be controlled by a back-pressure valve 57 if super-atmospheric distillation is desired. As the organic solvent descends column 54, it becomes more concentrated as the temperature rises and excess water is vaporized and removed. At the base of the column the solvent is heated by a reboiler 58 to the temperature corresponding to the desired concentration at the column pressure, and is then discharged from the column 54 through a line 59, which is preferably regulated by a valve 60 under the control of a liquid level controller 61. This hot, concentrated solution may be passed through the previously mentioned heat exchangers 52 and 44, via the lines shown 62 and 63, in order to conserve thermal energy. The concentrated solvent may now be returned directly to the sulfur dioxide absorber for reuse, after cooling. A solvent storage and surge tank 64 is provided in order to provide for constant operation of the system. Solvent from the heat exchangers 44 is discharged into the surge tank through a line 65 and/or to pump 67 through a line 68. The required quantity of solvent is passed through a pump 67, into a cooler 69, via line 70, and thence to the reactor 31 through the inlet 39, thus completing the cycle. The storage tank 64 is provided with an outlet valve 66 for withdrawal of solvent directly.

The reaction between the hydrogen sulfide and sulfur dioxide which takes place in the reactor will go forward under a wide range of operating conditions. For example, the process is not adversely affected by pressures in the range from atmospheric pressure to 3000 p.s.i.g., at temperatures as high as 260° F., although the efficiency of the process may be improved if the temperature is regulated within a range of about 100° F. to about 150° F. As with any chemical process, the operating conditions may be varied to achieve optimum yields. For example, an excess of sulfur dioxide of 10% to 20% over the theoretical amount may be adequate for the treatment of truly sour gases in a reactor of proper design. However, where the sour gas has a low hydrogen sulfide content, on the order of 1 to 20 grains of hydrogen sulfide per hundred cubic feet, a very substantial excess of sulfur dioxide over the stoichiometric requirement may be necessary for complete sweetening of the gas. Similarly, the organic solvent should be reactivated at temperatures appropriate to the particular solvent employed. For instance, when diethylene glycol is employed, a reboiler temperature in the range between 320° F. and 350° F. produces good results. When triethylene glycol is employed, the temperature may be between 350° F. and 400° F. These and other optimum operating conditions are either readily determinable from physical data or are obvious to those skilled in the art, once the basic invention is disclosed.

The sulfur dioxide for the reaction may be obtained in a variety of ways. It may be obtained by controlled burning of some of the product sulfur, in which case it may be introduced into the absorber column in either gaseous or liquid form, depending on system pressure requirements. Alternatively, the sulfur dioxide may be pre-dissolved in an organic solvent and may be pumped to the column in the form of a solution. Still another alternative would be to remove a portion of the hydrogen sulfide from the sour gas by the conventional amine reaction, oxidize it, and utilize the sulfur dioxide in the reaction. This last possibility tends to defeat the purposes of the invention to some extent when treating natural gas, but is highly desirable when treating acid gases from an amine-type desulfurizer or natural gases with high nitrogen or carbon dioxide contents to effect sulfur recovery.

*Example 2*

An industrial application of the invention is shown in FIG. 10 of the drawings which disclose a system wherein natural gas, containing 6.5% hydrogen sulfide, is treated at a rate of ten million standard cubic feet per day at a pressure of 500 pounds per square inch to yield 24.5 long tons of sulfur and 9,350M m.c.f. to dry, sweet natural gas for pipeline sale.

Referring to FIG. 10, sour natural gas at a pressure of 500 p.s.i.g. and a temperature of 80° F., enters a reactor 111 via a line 112 and passes upward through the gas-liquid contacting elements of this vessel where it is contacted by a descending stream of sulfur dioxide dissolved in diethylene glycol monoethyl ether, a solvent more commonly known as "Carbitol." This solution, at the rate of 100 gallons per minute, carries an excess of sulfur dioxide into the reactor 111 via a line 113 to insure complete reaction of all hydrogen sulfide contained in the inlet gas stream. The reaction between sulfur dioxide and hydrogen sulfide is immediate and complete at the gas-liquid interface and the sulfur formed in the reaction descends the reactor column 111 with the solvent in the form of a slurry. At the rate of flow specified here, the heat of reaction causes the temperature of the reacting mixture to rise to approximately 188° F. prior to accumulating in the base of the reactor 111. At this latter point, additional heat is applied through a coil 111a in sufficient quantity to increase the temperature of the slurry to approximately 260° F., at which temperature the sulfur particles coalesce and melt. Liquid sulfur settles into a lower liquid phase while the solvent forms the upper liquid phase. At 260° F. any sulfur dioxide remaining in solvent is stripped out and passes upward through the reactor column 111 where it may react with the sour gas continuously entering the column via the line 112, thus forming additional sulfur. Liquid sulfur, free from solvent, is withdrawn from the reactor 111 via a line 114 and passes into storage via a line 115, except for that portion which is directed to the sulfur burner via a line 116. Hot, sulfur-free solvent, which now contains water formed as a product of the reaction, passes at the rate of 97 gallons per minute from the reactor 111 via a line 117 and heat exchangers 118 and 119 and is discharged into the inlet of a still column 120 wherein the water is distilled overhead and discharged from the system via a line 121. The remainder of the solvent is further heated and regenerated in a reboiler 122, from which point it is discharged via a line 123, the heat exchanger 118 and a cooler 124 to a concentrated solvent storage tank 125 which operates at substantially atmospheric pressure and temperature.

Sour gas rising through the reactor 111 reacts with, and is cooled by, the sulfur dioxide-laden stream of solvent which enters the reactor via the line 113. The hydrogen sulfide-free gas passes from the reactor 111 via a line 126 and a cooler 127 wherein its temperature is reduced to the minimum level attainable with plant cooling water (approximately 95° F.) prior to entering a high pressure (500 p.s.i.g.) sulfur dioxide absorber 128. The gas rises through gas-liquid contacting devices within this column where it is contacted by a downflow of concentrated, sulfur dioxide-free solvent introduced into the absorber 128 from the tank 125 via a pump 129 and a line 130 at the rate of 95 gallons per minute. This concentrated solvent descends the absorber 128, effecting recovery of excess sulfur dioxide and water vapor from the gas and reducing the residual content of this compound to 0.25 grain per hundred standard cubic feet, or less, as the sweet, dry residue gas passes from the absorber via a line 131 enroute to market.

Solvent containing some water and sulfur dioxide in solution accumulates in the base of the absorber 128, whence it is discharged at the rate of about 96 gals./min. via a valve 132 and a line 133 into the upper portion of a low-pressure (approximately 5 p.s.i.g.) sulfur dioxide absorber 134. Descending this column, the solution absorbs the remaining sulfur dioxide requirement from the flue gas entering the absorber 134 via a line 135, and collects in the bottom of the absorber 134 whence it is discharged at a temperature of about 100° F. to the upper portion of the reactor 111 via a line 136, a pump 137 and the line 113, thus completing the solvent cycle.

Approximately one-third of the total liquid sulfur discharged from the bottom of the reactor 111 via the line 114 is diverted via the heat-jacketed line 116, maintained at a temperature of at least 260° F., to a sulfur burner 138 where it is oxidized with air from a compressor 139 which is connected to the burner 138 by a line 140. Hot flue gas (approximately 2100° F.,) passes from the sulfur burner via a line 141 to a waste heat boiler 142 where a portion of its heat content is utilized in the generation of process steam. The flue gas passes from the boiler 142 at a substantially lower temperature (about 700° F.) via a line 143, the heat exchanger 119 and a cooler 144 en route to the inlet to the low-pressure sulfur dioxide absorber 134 via the line 135. Residue flue gas is discharged from the absorber 134 via a line 145 and, being essentially nitrogen, is vented to the atmosphere.

It will be noted that this illustration of the sulfur recovery system differs from certain of the others presented heretofore, since the concentrated sulfur-free organic solvent flows first to the high-pressure sulfur dioxide absorber, thence to the low-pressure sulfur dioxide absorber to complete dissolution of this reactant, and is then pumped to the reactor where the reaction takes place and recovery of elemental sulfur is effected.

Example 3

Another embodiment of this invention is shown in FIG. 11 in which system the acid gases produced by a large amine-type gas sweetening plant are processed for sulfur, replacing the conventional Claus process. The illustrated installation will process 4000M c.f. per day of acid gas whose composition is 25% hydrogen sulfide and 75% carbon dioxide and which enters the sulfur recovery system at 10 p.s.i.g. and 100° F.

Referring to FIG. 11 acid gas from an amine-type sweetening plant enters the sulfur recovery system via a line 211, connected to a three-way valve 212. At the valve 212, the acid gas is split into two streams. The stream entering line 213 is twice the size of the stream entering line 214. The line 214 connects with a line 215 through which compressed air from a compressor 216 passes. The mixture of acid gas and air in the line 215 is introduced into a catalyst chamber 217 where the mixture of gases passes through a hot catalyst bed containing silica, bauxite or aluminum-nickel on pumice at 480–520° F. The amount of air from the compressor 216 is regulated with respect to the amount of hydrogen sulfide in the line 214 so that sufficient oxygen is present in the catalyst chamber 217 to oxidize the hydrogen sulfide completely to sulfur dioxide and water vapor. At the acid gas rate prescribed above, 2500 m.c.f. of air per day is required. The mixture of sulfur dioxide, carbon dioxide, nitrogen, water vapor and traces of other gases which issues from the catalyst chamber 217 passes via a line 218 through a cooling tower 219 and a line 220 into a reactor 221.

Acid gas is introduced into the reactor 221 by way of the line 213, which is connected to the reactor 221 adjacent the line 220 carrying the stream of sulfur dioxide admixed with other gases. The hydrogen sulfide introduced through the line 213 mixes inside the reactor 221 with the sulfur dioxide introduced through the line 220. This mixture of gases passes upward through the reactor 221, contacting a descending stream of a suitable organic solvent, such as triethylene glycol, which may contain sulfur particles and some sulfur dioxide in solution. Cool, concentrated sulfur dioxide-free solvent is pumped into the top of the vessel 221 via a nozzle 222 and the upper portion of vessel 221 serves as an absorber for unreacted sulfur dioxide which may tend to escape the reactor with the residue gas. In this instance, cool concentrated solvent is pumped into the absorber-reactor at a rate of approximately 140 gallons per minute so that the residue gas leaving the vessel via a line 223 is quite thoroughly dehydrated and denuded of sulfur dioxide. Proper control of operating conditions should produce an inert residue gas which might be processed for its carbon dioxide content or used for other purposes where an inert, dry gas is required.

Sulfur-laden solvent accumulating in the base of the reactor 221 flows to a slurry decanter and melt tank 225 via a line 224. Here the slurry is heated to 250–275° F. by hot solvent passing through a heating element 226 inserted through one end of the melt tank 225. Sulfur particles melt, agglomerate and settle into the lower, molten sulfur phase while the solvent rises to form the upper layer. Any dissolved gases such as sulfur dioxide are stripped from solution and are discharged back to the reactor 221 via a line 227. Molten sulfur is withdrawn from the system and run to storage via a line 228 while decanted solvent is withdrawn from the melt tank 225 via a line 229, picks up heat in exchangers 230 and is discharged into a solvent still 232 via a line 231. Here, the liquid portion of the feed descends the still and is contacted by rising vapors, principally steam, to the extent that excess water is stripped from solution and passes overhead from the still 232 via a vapor line 233, a condenser 234 and accumulates in a reflux drum 235. Such water as may be required for reflux passes to a reflux pump 237 via a line 236 whence it is lifted via a line 238 and discharged into the top of the still 232 via a nozzle 239. Proper use of water as reflux prevents the loss of excessive quantities of solvent in the still overhead. Excess water from the reflux drum 235 may be treated and used, or wasted as circumstances require. Noncondensible gases are vented from the reflux drum 235 via a line 240.

Solvent descending the still 232 accumulates on a chimney tray 241 and passes to twin reboilers 243 via lines 242. Here the solvent temperature is raised to the desired level, such as approximately 400° F. for triethylene glycol, and any vapors so generated are vented from the reboilers 243 via line 244 and discharged into the lower portion of the still 232 whence they pass upward through the chimney tray 241 to contact the descending solvent stream.

Hot solvent is withdrawn from the base of the still 232 via a line 245 en route to a hot solution pump 246. Solvent discharged from the pump 246 may pass either into the heating element 226 of the melt tank 225 via a line 247, or may be diverted by a valve 248, under control of a recording temperature controller 249 installed in the melt tank 225, to the heat exchangers 230 via a line 250. Emerging from the heat exchangers 230, the cooler solvent passes to a tubular cooler section 252, located in the lower portion of a cooling tower 253, via line 251. Here the solvent is cooled to approximately 100° F. and is directed to the upper portion of the absorber-reactor vessel 221, entering at the nozzle 222 via a line 254.

Cooling water from the basin of the cooling tower 253 is pumped over the tower by a pump 255 which may, if required, pump a portion of this water through reactor intercoolers 256 and 257 located in the absorber-reactor 221. By this means, control of reactor temperatures may be accomplished at a level which favors the reactions therein.

The system described here should produce approximately 38 long tons of sulfur per day and 5000M c.f. of dry, inert residue gas whose composition is approximately 60% carbon dioxide and 40% nitrogen with traces of oxygen. In addition, operation of the process will produce about 6500 gallons of water which might be utilized to good advantage in areas where water is scarce. Energy requirements approximate 150 brake horsepower for pumps and compressors and 170M c.f. per day of fuel gas for reboiler service.

What is claimed as new and is desired to be secured by Letters Patent of the United States is:

1. Apparatus for the removal of hydrogen sulfide from gas containing the same, which comprises the combination of a reaction chamber for contacting said gas with sulfur dioxide in the presence of an organic solvent to induce reaction between hydrogen sulfide and sulfur dioxide whereby sulfur and water are formed, a lower inlet connection for said gas into said reaction chamber, an upper inlet connection for a solution of said sulfur dioxide in a first portion of said organic solvent into said reaction chamber, mixing means within said reaction chamber to effect contact between said sour gas, said sulfur dioxide and said first portion of said organic solvent, a first absorber chamber for contacting treated gas from the reactor chamber with a second portion of said organic solvent to absorb and remove sulfur dioxide from said treated gas and communicating with said reaction chamber to cycle gas between said reaction chamber and said first absorber chamber, an outlet connection for treated gas at the top of said first absorber chamber, an inlet connection near the top of said first absorber chamber for introduction of said second portion of said organic solvent, an outlet connection for said organic solvent containing water and sulfur from the bottom of said reaction chamber, means for heating said organic solvent containing water and sulfur to a temperature above the melting point of sulfur to liquify and coagulate said sulfur, means for separating said liquified sulfur from said organic solvent containing water, still means for drying said organic solvent by heating it to a temperature whereat the water contained therein is evaporated, a second absorber chamber, means for cycling said dried organic solvent to said second absorber chamber, an inlet connection near the top of said second absorber chamber wherein the organic solvent is introduced and descends countercurrent to a stream of sulfur dioxide gas and is removed from the bottom of said second absorber chamber through an outlet connection, an inlet connection for sulfur dioxide near the bottom of said second absorber chamber, pumping means for transferring said organic solvent containing sulfur dioxide from the outlet of said second absorber chamber to the upper inlet connection into said reaction chamber.

2. Apparatus as defined in claim 1 wherein the lower inlet connection into said second absorber chamber is connected to a sulfur burner so as to provide a source of sulfur dioxide to said second absorber chamber, said sulfur burner being in turn connected to said sulfur removal means to provide means for transporting a part of the separated sulfur to the sulfur burner for oxidation to sulfur dioxide.

3. Apparatus for the removal of hydrogen sulfide and nitrogen from gas containing the same, which comprises the combination of a reaction chamber for contacting said gas with sulfur dioxide in the presence of an organic solvent to induce reaction between hydrogen sulfide and sulfur dioxide to form sulfur and water, means for supplying organic solvent to said reaction chamber, a first absorber chamber communicating with said reaction chamber for contacting treated gas with liquid sulfur dioxide to absorb nitrogen therefrom and for passage of solvent between said absorber chamber and said reactor chamber, means for supplying liquid sulfur dioxide to said first absorber chamber, a second absorber chamber connected to said first absorber chamber for contacting treated gas with said organic solvent to remove sulfur dioxide therefrom, means connected to said reaction chamber for separating sulfur from organic solvent and water, means for recycling organic solvent to said absorber and reaction chambers, means connected to said first absorber chamber for separating nitrogen from the liquid sulfur dioxide, and means for recycling liquid sulfur dioxide to said reactor and first absorber chambers.

4. Apparatus for the removal of hydrogen sulfide and nitrogen from gas containing the same, which comprises the combination of a reaction chamber for contacting said gas with sulfur dioxide in the presence of an organic solvent to induce reaction between hydrogen sulfide and sulfur dioxide to form sulfur and water, means for supplying organic solvent to said reaction chamber, a first absorber chamber communicating with said reaction chamber for contacting treated gas with liquid sulfur dioxide to absorb nitrogen therefrom and for passage of solvent between said absorber chamber and said reactor chamber, means for supplying liquid sulfur dioxide to said first absorber chamber, a second absorber chamber connected to said first absorber chamber for contacting treated gas with said organic solvent to remove sulfur dioxide therefrom, means connected to said reaction chamber for separating sulfur from organic solvent and water, means for recycling organic solvent to said absorber and reaction chambers, refrigeration means connected to said first absorber chamber for separating nitrogen from the liquid sulfur dioxide, and means for recycling liquid sulfur dioxide to said reactor and first absorber chambers.

5. Apparatus for the removal of hydrogen sulfide and nitrogen from gas containing the same, which comprises the combination of a reaction chamber for contacting said gas with sulfur dioxide in the presence of an organic solvent to induce reaction between hydrogen sulfide and sulfur dioxide to form sulfur and water, means for supplying organic solvent to said reaction chamber, a first absorber chamber communicating with said reaction chamber for contacting treated gas with liquid sulfur dioxide to absorb nitrogen therefrom and for passage of solvent between said absorber chamber and said reactor chamber, means for supplying liquid sulfur dioxide to said first absorber chamber, a second absorber chamber connected to said first absorber chamber for contacting treated gas with said organic solvent to remove sulfur dioxide therefrom, means connected to said reaction chamber for separating sulfur from organic solvent and water, means for recycling organic solvent to said absorber and reaction chambers, refrigeration means connected to said first absorber chamber for separating nitrogen from the liquid sulfur dioxide, means for removing sulfur dioxide gas from the nitrogen gas, and means for recycling liquid sulfur dioxide to said reactor and first absorber chambers.

6. Apparatus for the removal of hydrogen sulfide and nitrogen from gas containing the same, which comprises the combination of a reaction chamber for contacting said gas with sulfur dioxide in the presence of an organic solvent to induce reaction between hydrogen sulfide and sulfur dioxide to form sulfur and water, means for supplying organic solvent to said reaction chamber, a first absorber chamber communicating with said reaction chamber for contacting treated gas with liquid sulfur dioxide to absorb nitrogen therefrom and for passage of solvent between said absorber chamber and said reactor chamber, means for supplying liquid sulfur dioxide to said first absorber chamber, a second absorber chamber connected to said first absorber chamber for contacting treated gas with said organic solvent to remove sulfur dioxide therefrom, means connected to said reaction chamber for separating sulfur from organic solvent and water, means for dehydrating and recycling organic solvent to said absorber and reaction chambers, refrigeration means connected to said first absorber chamber for separating nitrogen from the liquid sulfur dioxide, means for removing sulfur dioxide gas from the nitrogen gas, and means for recycling liquid sulfur dioxide to said reactor and first absorber chambers.

7. Apparatus for the removal of hydrogen sulfide and nitrogen from gas containing the same, which comprises the combination of a reaction chamber for contacting said gas with liquid sulfur dioxide and an organic solvent to induce reaction between hydrogen sulfide and part of the sulfur dioxide to form sulfur and water and to remove nitrogen from said gas by absorption by the remainder of the liquid sulfur dioxide, means for supplying liquid sulfur dioxide and organic solvent to said reaction chamber, an absorber chamber communicating with said reactor chamber for contacting treated gas with said organic solvent to absorb sulfur dioxide therefrom and for passage of solvent between said absorber chamber and said reactor chamber, means for supplying organic solvent to said absorber chamber, means connected to said reaction chamber for separating sulfur from organic solvent and water, means for dehydrating and recycling organic solvent to said absorber and reaction chambers, means connected to said absorber chamber for separating nitrogen gas from liquid sulfur dioxide, means for removing sulfur dioxide gas from the nitrogen gas, and means for recycling liquid sulfur dioxide to said reactor and absorber chambers.

8. Apparatus for the removal of hydrogen sulfide from gas containing the same comprising means for contacting said gas with sulfur dioxide in the presence of an organic solvent to induce reaction between the hydrogen sulfide and sulfur dioxide to form sulfur and water, inlet means to the first-mentioned means for said gas, sulfur dioxide and organic solvent mixing means within said first-mentioned means, means communicating with said first-mentioned means for contacting treated gas with said organic solvent to absorb sulfur dioxide therefrom and for passage of solvent between said absorber chamber and said reactor chamber, outlet means for treated gas from the last above-mentioned means, inlet means to said last above-mentioned means for organic solvent near the top of said last above-mentioned means, outlet means for organic solvent containing water and sulfur from said last above-mentioned means, means communicating with said last above-mentioned means for cycling organic solvent to said first-mentioned means and to said last above-mentioned means.

References Cited in the file of this patent
UNITED STATES PATENTS

| | | |
|---|---|---|
| 2,177,068 | Hutchinson | Oct. 24, 1939 |
| 2,370,020 | Doumani | Feb. 20, 1945 |
| 2,445,468 | Blohn | July 20, 1948 |
| 2,772,146 | Peppig | Nov. 27, 1956 |
| 2,881,047 | Townsend | Apr. 7, 1959 |
| 2,992,076 | Thompson et al. | July 11, 1961 |
| 2,998,304 | Urban et al. | Aug. 29, 1961 |

UNITED STATES PATENT OFFICE
CERTIFICATE OF CORRECTION

Patent No. 3,170,766 February 23, 1965

Francis Mark Townsend

It is hereby certified that error appears in the above numbered patent requiring correction and that the said Letters Patent should read as corrected below.

Column 22, line 27, after "for" insert -- separating sulfur from organic solvent and means for --.

Signed and sealed this 27th day of July 1965.

(SEAL)
Attest:

ERNEST W. SWIDER
Attesting Officer

EDWARD J. BRENNER
Commissioner of Patents